No. 881,180. PATENTED MAR. 10, 1908.
J. W. CUTLER.
MAIL CHUTE.
APPLICATION FILED FEB. 23, 1907.
5 SHEETS—SHEET 1.
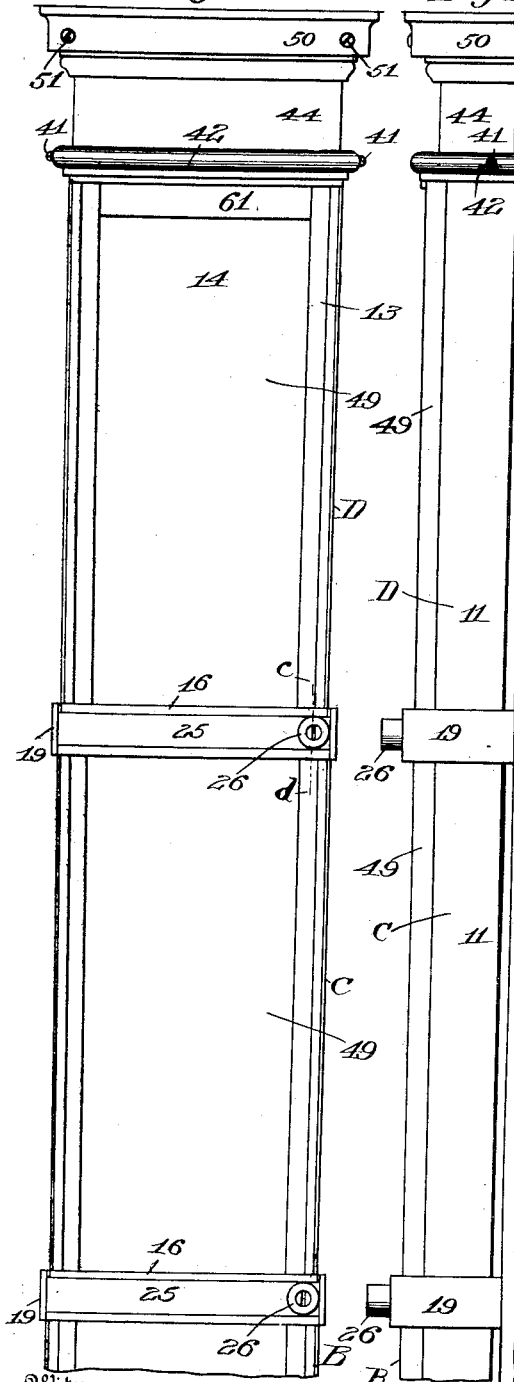
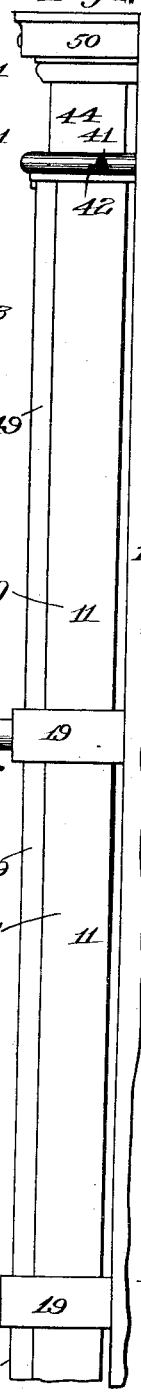
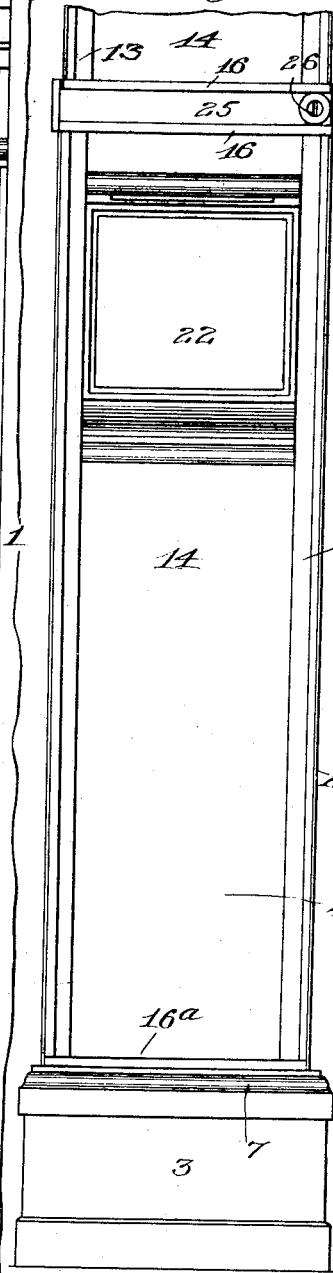
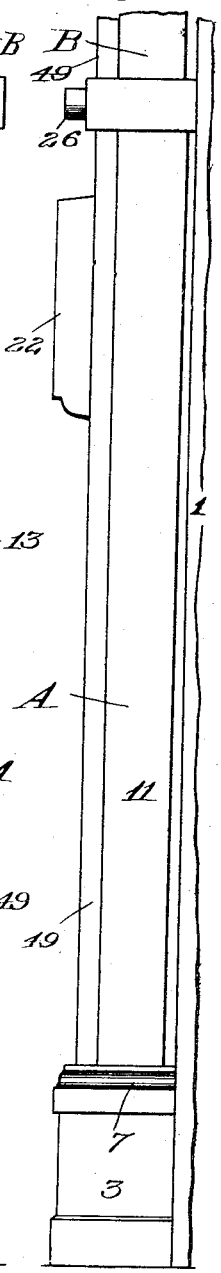
Witnesses
Walter B. Payne
Russell B. Griffith
Inventor
Joseph Warren Cutler
By Church & Rich
his Attorneys

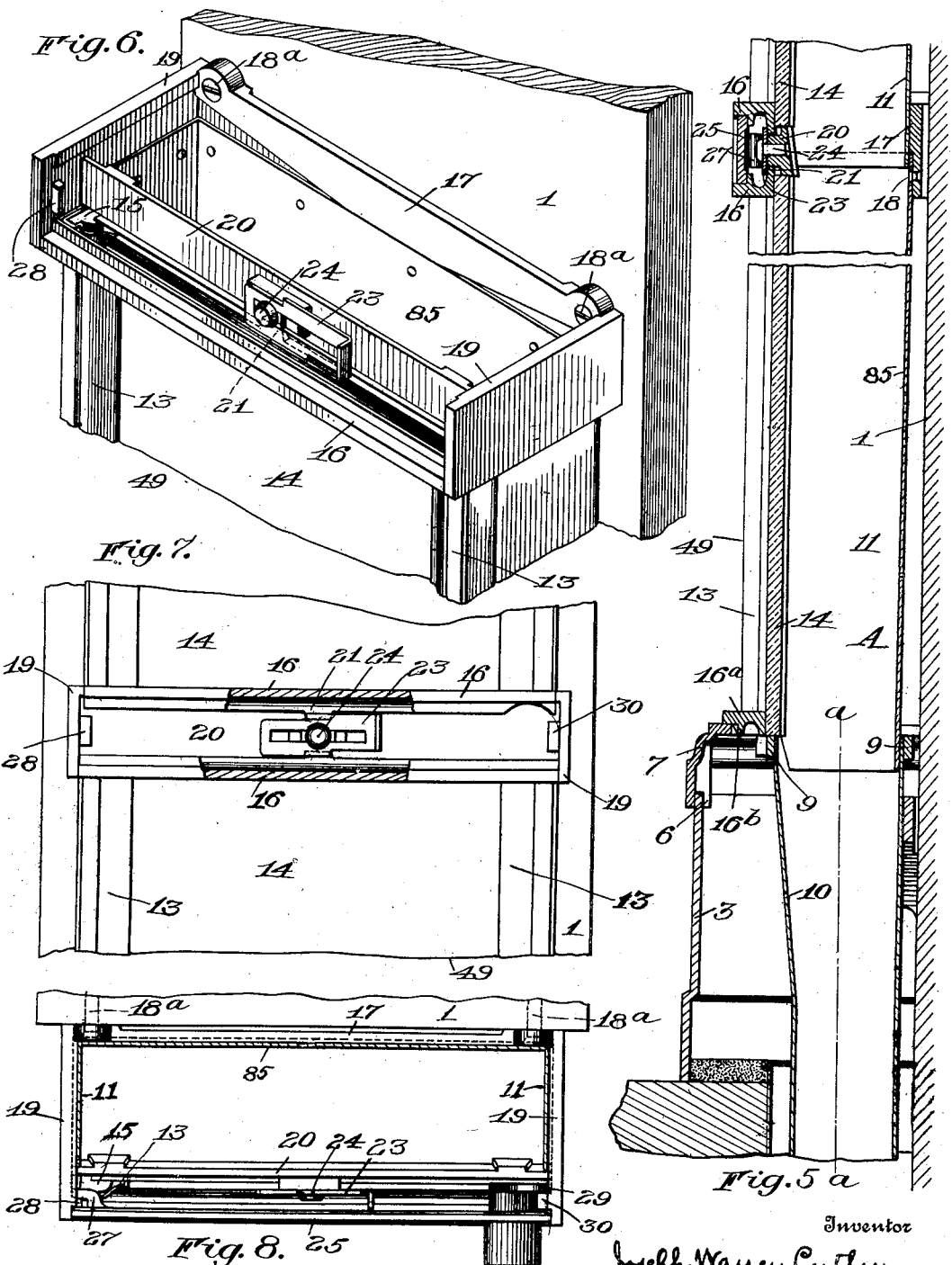

No. 881,180. PATENTED MAR. 10, 1908.
J. W. CUTLER.
MAIL CHUTE.
APPLICATION FILED FEB. 23, 1907.
5 SHEETS—SHEET 3.
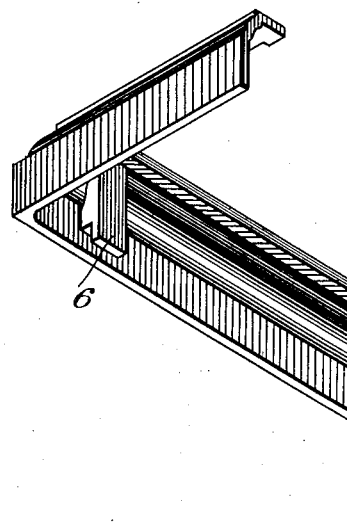
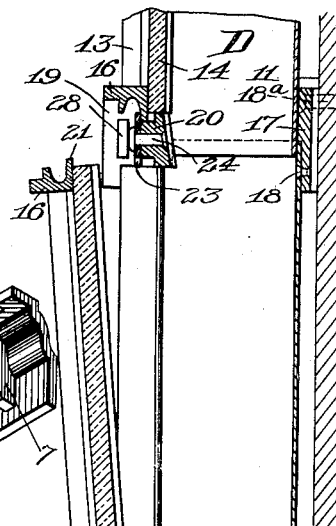
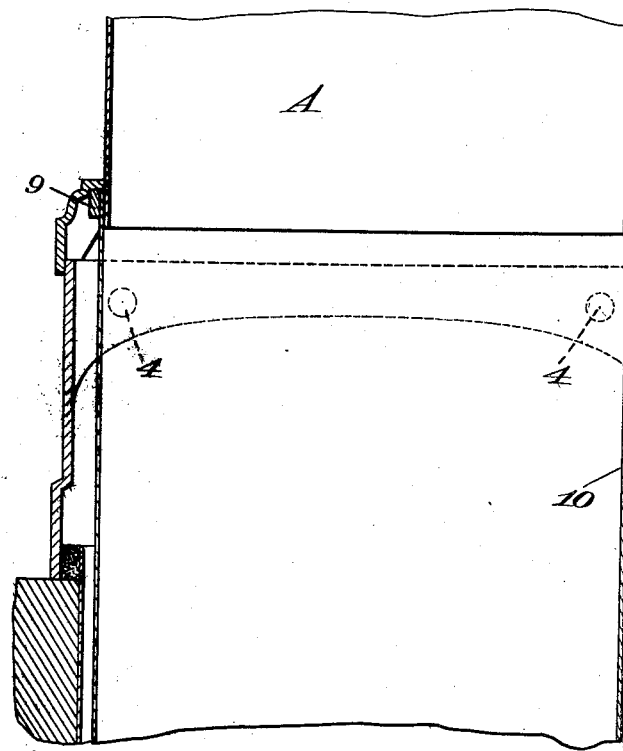
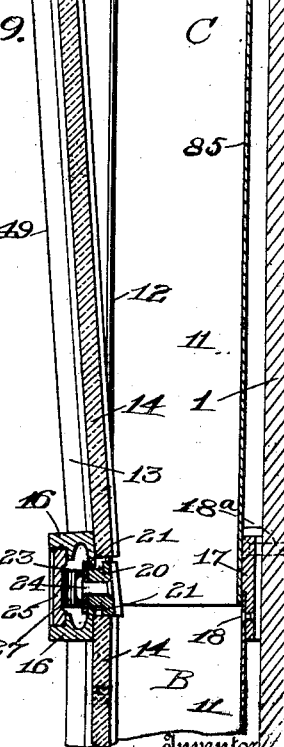

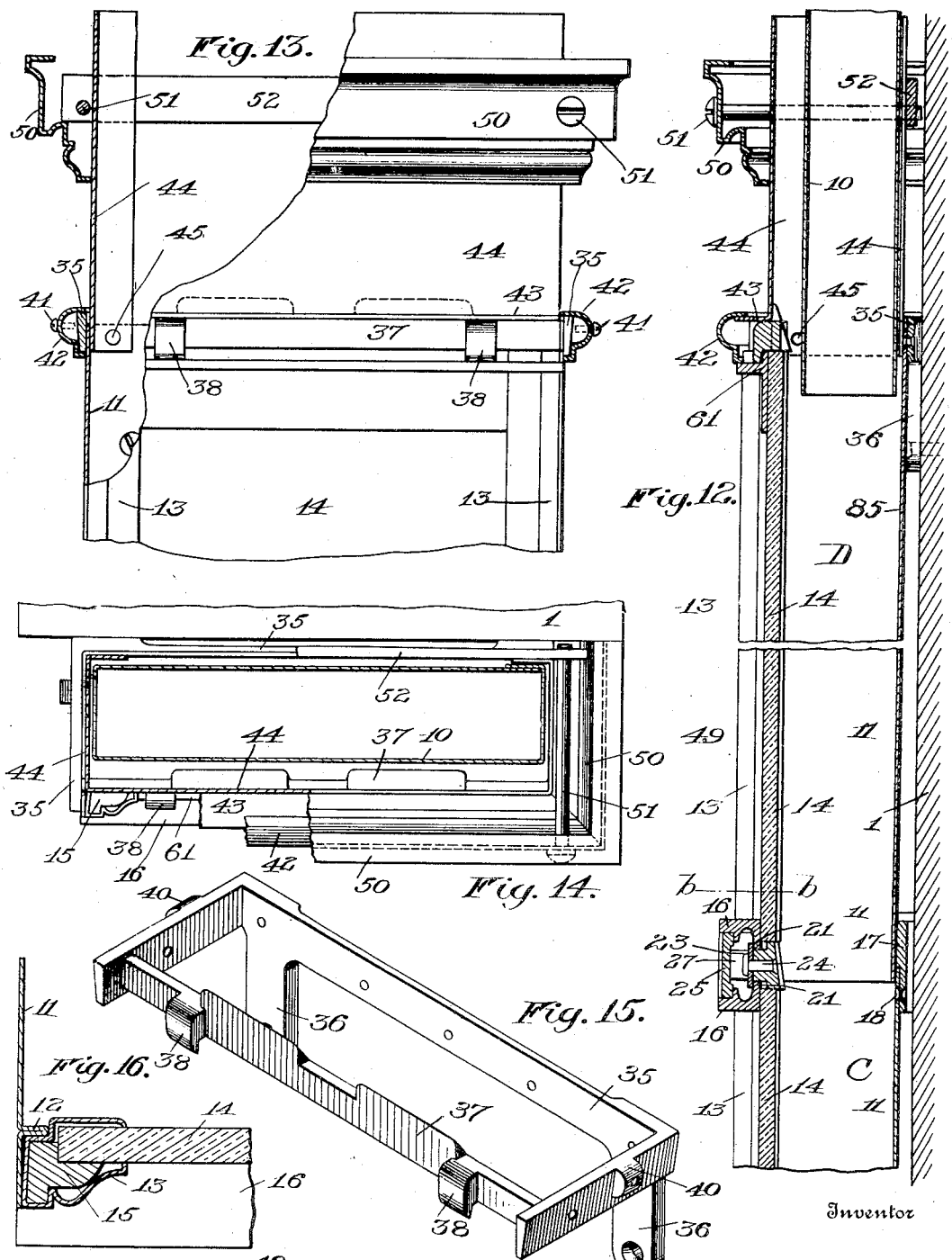

No. 881,180.
PATENTED MAR. 10, 1908.
J. W. CUTLER.
MAIL CHUTE.
APPLICATION FILED FEB. 23, 1907.
5 SHEETS—SHEET 5.
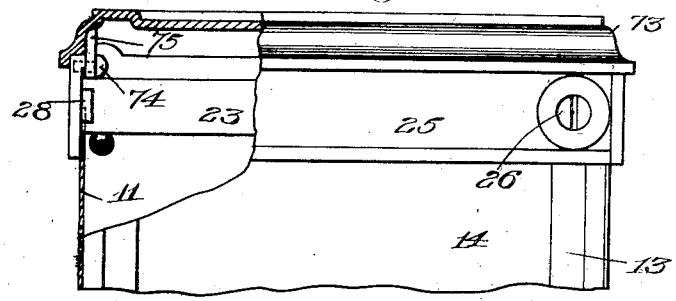
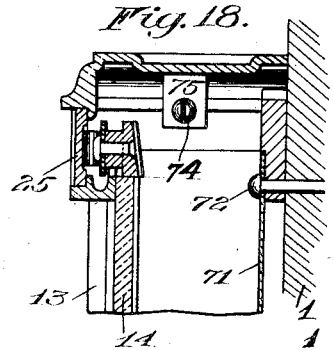
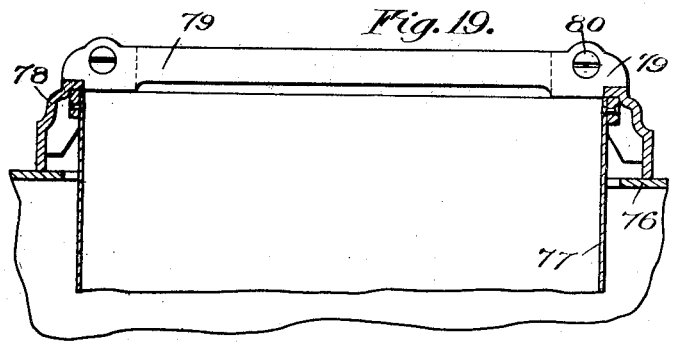
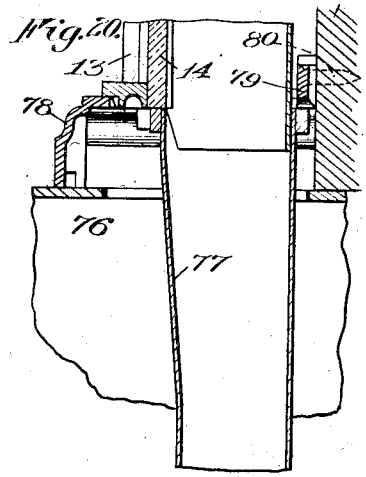
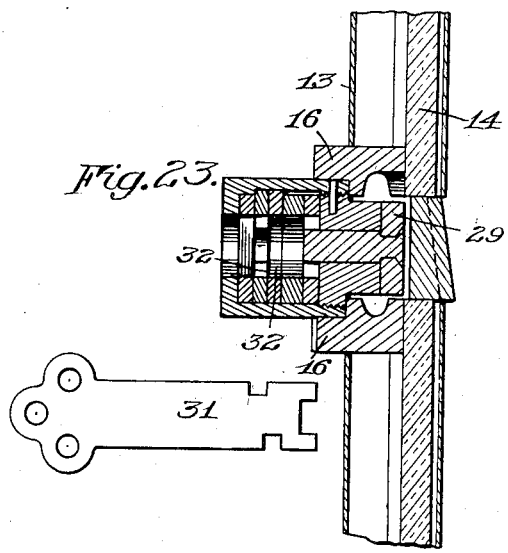
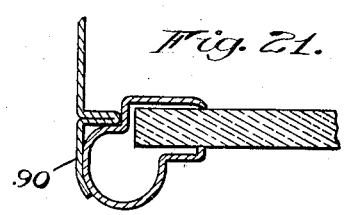
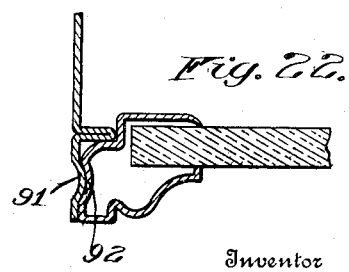
Witnesses
Walter B. Payne
Russell B. Griffiths
Inventor
Joseph Warren Cutler
By Churchos Rich
Attorneys

UNITED STATES PATENT OFFICE.

JOSEPH WARREN CUTLER, OF ROCHESTER, NEW YORK, ASSIGNOR TO CUTLER MANUFACTURING COMPANY, OF ROCHESTER, NEW YORK, A CORPORATION OF NEW YORK.

MAIL-CHUTE.

No. 881,180.  Specification of Letters Patent.  Patented March 10, 1908.

Application filed February 23, 1907. Serial No. 358,796.

*To all whom it may concern:*

Be it known that I, JOSEPH WARREN CUTLER, of Rochester, in the county of Monroe and State of New York, have invented certain new and useful Improvements in Mail-Chutes; and I do hereby declare the following to be a full, clear, and exact description of the same, reference being had to the accompanying drawings, forming a part of this specification, and to the reference-numerals marked thereon.

My invention relates to mail chutes for conveying letters or other postal matter from the various upper stories of a building to a receptacle or mail box in a lower story, and has for its object to provide a device of this character, the parts of which may be readily made and assembled, and in which access may be readily had to the interior of the chute by authorized persons only for the purpose of the removal of mail matter in case the chute should become clogged, or for cleansing the same, and it further has for its objects to provide means whereby after the chute has been erected, it can only be taken down or the parts removed by such authorized persons.

To these and other ends the invention consists in certain improvements and combinations of parts, all as will be hereinafter more fully explained, the novel features being pointed out in the claims at the end of the specification.

In the drawings: Figure 1 is a front elevation of the upper part of that portion of a chute extending between the ceiling and floor of the building. Fig. 2 is a side elevation of the same. Fig. 3 is a front view of the lower part of that portion of the chute extending between the ceiling and floor of a building. Fig. 4 is a side elevation of the same. Fig. 5 is a vertical sectional view of the lower portion of the chute shown in Figs. 3 and 4, the part or bracket containing the mail-receiving aperture being omitted. Fig. 6 is a perspective view showing the bracket located between intermediate sections of the chute. Fig. 7 is a front elevation showing the meeting ends of the chute sections with the lock-cover plate removed. Fig. 8 is a horizontal sectional view taken just above the bracket shown in Fig. 6 with the front panel of the upper section removed. Fig. 9 is a vertical sectional view showing the manner of removing one of the intermediate panels. Fig. 10 is a sectional view on the line *a—a* of Fig. 5. Fig. 11 is a perspective view of the top of the base section. Fig. 12 is a vertical sectional view of the upper portion of the chute next to the ceiling. Fig. 13 is a front view of the same with a portion of the upper cornice section broken away and one side of the chute shown in section. Fig. 14 is a plan view of the upper cornice section with parts broken away. Fig. 15 is a perspective view of one of the brackets for holding the upper section of the chute. Fig. 16 is a sectional view on the line *b—b* of Fig. 12. Fig. 17 is a front elevation, partly in section, of the extreme upper end of the chute. Fig. 18 is a vertical sectional view of the same. Fig. 19 is a vertical sectional view of the lower section or portion of the chute entering the mail box or receptacle. Fig. 20 is a vertical sectional view of the parts shown in Fig. 19 taken at right angles to said last mentioned figure. Figs. 21 and 22 are horizontal sectional views showing modifications of the coöperating portions of the movable panels or parts, and the forwardly-extending wall of the channel. Fig. 23 is a vertical sectional view on the line *c—d* of Fig. 1.

Similar reference numerals in the several figures indicate similar parts.

The mail chute as a whole is adapted to extend from the upper part of a building to the lower floor, where there is located a mail box or receptacle adapted to receive mail matter, and is provided at each floor with a mail-receiving aperture, provided, as usual, with suitable means for preventing letters or packages of too great bulk from being deposited, and as the portion of the chute extending from the ceiling to the floor is the same at each of the floors, it is unnecessary to show or describe more than one set of sections.

As usual in devices of this nature, the different parts going to make up the chute are secured mediately or immediately to a support or back or backing which I have indicated in the drawings by 1, and this may be a structure adapted particularly for the purpose, or one of the walls of the building, it being sufficient that it forms the support for the chute and is generally of such nature that it is not liable to warp or be otherwise thrown out of the vertical position.

Mail chutes are usually constructed in sections of such length that the structure as a whole may be readily erected or dismantled when necessary, and it is eminently desirable that the device be so constructed that access may be had to the interior thereof for the purpose of removing obstructions or cleaning it, by authorized persons only, such as post office employees, and that provision be made for preventing the removal of the chute or any part of it, excepting by such authorized persons.

The only preparation needed in the building for the erection of my improved chute is the provision of the backing or support 1, and the formation of suitable apertures in the floors of a size larger than the cross sectional area of the chute.

The base of the chute or part arranged next the floor consists of a base or casting 3 open at the top and preferably on its rear side and adapted to be secured to the backing or support 1 by screws 4, passing through suitable lugs, or preferably a band arranged at the rear as in Figs. 5 and 10, so that when the parts are assembled, access cannot be had to these fastening devices. Resting loosely upon the upper ends of the front and the sides of this base casting is the base cap or molding 5, having at the front the lugs 6 for engaging the top of the base provided with the downward extensions extending inside the upper edge of the base, and preventing the forward movement of the cap. Located at the inner sides of each of the rearward extensions of the cap 5 are lugs 7, also resting on the top of the base 3 and having their upper corners notched to receive a strap or band 9 riveted to the upper end of the tapered tube or section 10 which extends through the floor aperture and into the upper end of the chute on the floor below.

The chute sections arranged above the base and between it and the ceiling may be of any desired number, depending upon the distance between these points, portions of the sections adjacent the floor and ceiling being adapted especially to coöperate with the fittings at these parts, while the intermediate sections are alike and interchangeable. In the preferred form, however, all of the sections are characterized by having removable portions or panels, preferably arranged at the front, the joints between said panels and the sides of the chute sections being so constructed that descending mail matter is not liable to catch therein, and by the provision of parts or flanges extending forwardly beyond the joint to protect the latter and prevent the insertion of a tool to pry the panel forward, this construction enabling me to secure the panels by fastening devices located at or near the ends of the sections.

In Figs. 1 to 4 of the drawings I have shown four chute sections arranged between the floor and the ceiling, the lower section A coöperating with the base, the sections B and C above these being similar to each other in all respects, and being interchangeable, and the upper section being adapted to coöperate with the ceiling connection, but the body of each of these is preferably constructed of a sheet metal channel open at the front and provided with the back 85 and the forwardly-extending flanges 11 at the sides, the lower end of each of these channels being adapted to fit within the upper end of the one below it, and the open fronts of the sections are adapted to be closed by movable portions or panels composed in whole or in part of glass, to permit inspection of the interior of the chute. The side flanges 11 of the channels are provided somewhat in rear of their forward edges, with projections, ribs or abutments 12, preferably formed by doubling the sheet metal upon itself, as shown in Fig. 16, said ribs not only serving to stiffen the sides, but also to form stops or seats for the sides of the movable portions or panels. The removable front portions or panels, indicated generally by 49, are composed of the vertically-extending moldings 13, preferably formed of single pieces of sheet metal with their inner edges tightly engaging the inner and outer surfaces of the glass 14, said moldings being stiffened by filling pieces 15 and provided with recesses in their outer rear edges for the accommodation of the beads 12, the latter projecting forwardly of the rear surfaces of the moldings, when the parts are assembled thereby forming a protected joint for preventing the entrance of the edges of descending mail matter. The moldings of the panels are also connected near their upper and lower ends by cross bars 16 with which are adapted to engage retaining devices for holding the panels in position and against said beads or ribs 12.

When the panels are in position, the sides 11 of the channels extend sufficiently far forward of the beads or ribs to prevent prying the panel forward by the insertion of a tool between the rear face of the panel and said flanges. If desired, the portion of the channel forward of the beads could be curved or made yielding so as to embrace with spring action, the sides of the panel, as shown particularly in Figs. 21 and 22. In the first mentioned figure, the molding on the panel is rounded and the free edge 90 springs outside of it, and in the construction shown in Fig. 22 the molding and free edge of the channel are formed with depressions and projecting portions 91 and 92 respectively, which coöperate with more or less spring action.

The channels, with the exception of that of the uppermost section, are secured at their upper ends to brackets 17, such as shown in Fig. 6, by means of rivets 18, or other suitable securing devices, said brackets being in turn secured to the support 1 by fastening devices such as screws 18ª, and having the forwardly-projecting arms 19, between which extends the cross bar 20, the inner side of the latter being inclined toward the rear slightly, as shown in Figs. 5, 9 and 12, to prevent mail matter from catching on the upper end of the glass 14 of the next lower panel. The cross bars 20 of the brackets constitute stationary supports arranged at intervals across the open side of the chute when all the panels are removed. The lower ends of each of the channels are adapted to extend into the upper ends of the next lower channels beneath them at the sides and rear, thus forming a series of telescoping sections, said lower ends covering the securing screws 18ª when the parts are in position. The cross bar 16ª at the lower end of the panel or portion of the section A just above the base, is provided with a short downwardly-extending flange 16ᵇ, slightly beveled at the front and adapted to extend inside of the base molding 5 when the latter is in position, so that its forward movement is prevented, this bar or plate 16ª being generally the same as the bar 16 at the lower end of each of the other panels, but it is not provided, as are the other bars, with the centrally arranged locking lug or projection 21.

The front panel of the section A next above the base is preferably provided with the usual mail-receiving aperture, formed in a frame or part indicated by 22, Figs. 3 and 4, but which is omitted from the other illustrations, as this may be of the well known or any desired type, such for instance as is shown in my prior patent No. 788,709. The panels above the lowermost one are adapted to rest upon the cross bars 20 of the brackets 17, and are held in position by a movable catch or holding member mounted on said cross bar and adapted to engage with the lugs 21. In the present arrangement this catch or holding device embodies a plate 23 having a slot through which passes a headed pin or projection 24 secured to the bar permitting sliding movement in either direction from the center. The opposite edges of this plate are cut away on opposite sides of the center, and as the lugs 21 on the cross bars 16 are centrally arranged, the plate when moved in one direction from the center, will release one of said bars, and when moved in the opposite direction, will release the other, and when in the central position, as shown in Fig. 7, the adjacent panels are held in position, with the sides of the panels against the flanges 12 on the channel, the construction being such that either one of the panels may be removed by sliding the plate in one or the other direction. In order to lock the parts securely in position however, and incidentally to prevent access to this panel-locking device by unauthorized persons, I provide a lock bar or plate 25 extending between the forward ends of the side arms 19 of the bracket 17, and engaging the ends of the panels, said plate being secured in position by a key lock such as 26. In the present instance this lock plate is provided at one end with a lug 27 adapted to extend behind a lug 28 on one of the arms 19, and at the other end the bolt or button 29 of the lock is adapted to extend behind a lug 30, when said button is turned by the key, but it may coöperate in any other suitable manner. I prefer that the lock employed for securing this plate should be one which is not readily capable of unauthorized manipulation, and preferably such as shown in Fig. 23, embodying a movable disk connected to the button 29, operated by a key 31, provided with slots or recesses corresponding to projecting ward plates 32 arranged in the casing of said lock, but any ordinary Yale lock of approved construction could be used.

The upper chute section, or that nearest the ceiling, is also composed of a channel similar to the others, but its upper end is riveted to a bracket 35 provided at its rear with downwardly-extending lugs 36, through which and the rear of the channel, are passed the securing screws for holding said bracket to the support 1, the heads of these screws being flush with or back of the interior surface of the channel to prevent the lodgment of mail matter thereon. The cross bar 37 of the bracket 35 is provided with the downwardly-extending lugs 38 at the front, with which the bar 61 of the upper panel is adapted to engage, this panel being secured in position by inserting the upper cross bar or the flange thereon, behind these lugs, then moving the lower end rearward until it is secured by the locking plate 23 on the bracket below.

The side bars of the bracket 35 are provided with perforated lugs 40 having threaded apertures into which pass screws 41, extending also through sides of a molding 42, which extends across the front and on the two sides of the chute, its front portion overlapping the flange 43 at the lower end of the ceiling piece 44 which rests upon the cross bar of the bracket, forward of the upper inclined edge thereof, as shown in Figs. 12 and 15. This ceiling piece which is a cover for the chute proper, is composed of a sheet metal channel section 44 secured at its lower end to the bracket 35 by rivets or similar fastenings 45, and extends up into the ceiling aperture above the ceiling, covering the space between the top of the upper movable panel and the ceiling, and through this passes the floor tube 10 from the story above.

50 indicates the ornamental sheet metal molding forming a cornice which is adjustable upon the tubular section 44 and is arranged to form the ceiling finish, being secured in position by screws 51 extending through the front at the sides of the chute, back into a clamp plate 52 arranged in rear of the tube 44, as shown particularly in Figs. 12, 13 and 14.

By the employment of the ceiling sections 44 secured to the bracket 35, I am enabled to adapt the chute to different ceiling heights within reasonable limits, as said sections may be of different or standard lengths, and may project a greater or less distance into the ceiling aperture and the proper finish is obtained by the adjustment of the cornice section of collar. In Figs. 17 and 18 I have shown the cap or cover for the extreme upper end of the chute, the channel 71 of the top chute section being riveted or otherwise secured to a bracket similar to the brackets 17, secured to the support 1 by screws 72, the forward portion of said bracket having the locking catch 23 thereon for engaging the front panel and by the lock plate 25, the top cover plate and molding 73 being secured to this bracket by screws 74 passing through lugs 75, and accessible only when the front panel is removed.

The connection between the lowermost section and the letter box or receptacle indicated by 76 is not essentially different from that between the lower end of one of the floor sections and the base, the short tube 77 corresponding to the floor tube 10 and supported in a similar manner from a cap or molding 78 which is precisely the same as the base cap or molding 5, excepting that it is provided at the rear with perforated cross bars 79 through which pass screws 80, securing it to the support 1, these screws being covered by the lowermost chute sections when in place, to prevent their removal, this construction being shown fully in Figs. 19 and 20. It will be understood that if desired, the base cap 5 shown in Fig. 11, may be provided with these attaching lugs and secured to the backing or support 1, but it is found that this is not necessary, as the front panel of the section A next the floor will effectually hold this cap plate in position.

It will be noted that in the chute shown and described herein, an authorized person having possession of the key for the locks, may obtain ready access to the interior of the chute by removing one of the lock bars, say the one at the upper end of the section A, sliding the catch 23, tilting forward the upper end of the panel and then raising its lower end out of contact with the base cap, or if it is desired to remove either or both of the sections B and C, is it only necessary to remove the lock plate arranged between them, and then to slide the plate 23 in a direction to disconnect one, (the other being held in the meantime,) and in the opposite direction to disconnect the other when the panel may be tilted forward at either end as shown in Fig. 9 the connection between the ends of the panels and the lock bars permitting this slight tilting movement though they effectually prevent direct forward movement, the space in rear of the bars forming in effect, sockets in which the ends of the panels are received. The channel sides may yield slightly enabling this tilting to be accomplished without straining the parts. The removal of this plate also enables the channel section, which is secured adjacent thereto, to be removed also by the removal of the securing screws if desired. In a similar manner by disengaging the lock plate between the sections C and D, either or both of these may be removed.

It will of course be understood that though in the present embodiment of the invention the panels are shown as located at the front of the chute, as this is more convenient, the terms front, sides etc., are entirely relative, and excepting when specific relations are necessary, these are not used as words of limitation.

While it is desirable that the flanges 90 and 92 (in the structures shown in Figs. 21 and 22) extend the whole length of the panel, it is obvious that the parts which engage with spring or yielding action would serve to hold the panel temporarily if they extended only part way, that is if these yieldingly engaging parts were located at only one, or if desired, several separated points in the length of the panel. This temporary or yielding form of fastening could be used to hold the panels in position in lieu of the catch plates 23 during the renewal or replacement of the lock bars or in connection with the latter to protect the joints in the manner described.

I claim as my invention:

1. In a mail chute, the combination with the open channel having the projections at their inner sides in rear of their outer edges, of a laterally movable panel arranged between said outer edges and engaging said projection.

2. In a mail chute, the combination with the channel having the forwardly-projecting sides and the inwardly-extending ribs thereon located in rear of the outer edges, of the laterally movable panel arranged between the outer edges of the channel sides and engaging the outer faces of the ribs.

3. In a mail chute, the combination with the channel composed of sheet material and having the sides doubled to form longitudinal ribs in rear of the outer edges, of a laterally movable panel arranged between the outer edges of the sides and engaging the said ribs.

4. In a mail chute, the combination with the channel having the projections on the inner sides in rear of their outer edges, of a laterally movable panel located between the outer edges of the sides and engaging the projections and means for fastening the panel at its ends.

5. In a mail chute, the combination with the channel composed of sheet material having the longitudinal ribs formed in the sides and in rear of the outer edges of the latter, of a laterally movable panel arranged between said outer edges and engaging the ribs and fastening devices for securing the ends of said panel in position.

6. A mail chute open at one side, in combination with a plurality of movable panels for closing said open side, said panels being mounted to tilt in vertical planes and a securing device controlled by a key lock for holding the adjacent ends of said panels in position.

7. A mail chute open at one side and having ribs at the inner sides of said opening in rear of the front edges thereof, in combination with a plurality of laterally movable panels for closing said opening extending within the sides of the chute and engaging said ribs and means for engaging the ends of the panels to secure them in position.

8. A mail chute open at one side, in combination with a plurality of panels for closing said opening, mounted to tilt in a vertical plane only and a means controlled by a key lock for securing the adjacent ends of the panels in position.

9. A mail chute open at one side, and having stops at the inner sides of said opening in rear of the edges thereof, in combination with a plurality of panels for closing said opening extending within the sides of the chute, engaging said stops and having a detachable connection at their upper and lower ends with the chute, a member for holding the adjacent ends of the panels in position and a key lock for securing said member in position.

10. A mail chute open at one side, in combination with two movable panels for closing said opening, means for engaging and holding the remote ends of said panels in position but permitting their disengagement when their adjacent ends are moved outwardly, means for securing their adjacent ends against outward movement and a key lock for controlling the operation of said means.

11. A mail chute open at one side, in combination with two movable panels for closing said opening, means for engaging and holding the remote ends of said panels in position but permitting their disengagement when their adjacent ends are moved outwardly, a lock bar for securing the adjacent ends of the panels from outward movement and a key lock for securing said bar in position.

12. A mail chute open at one side, and sockets at the ends of said opening, in combination with two panels the remote ends of each panel engaging a socket and adapted to be removed when tilted therein, a locking member for engaging the adjacent ends of the panels and holding them and a key lock for controlling the movement of said member.

13. A mail chute open at one side, in combination with a plurality of removable panels for closing said opening, removable bars located across the adjacent ends of the panels and upon which the ends of the panels may have a vertical tilting movement to disengage their opposite ends, and key locks for controlling the movement of said bars.

14. A mail chute open at one side, in combination with two removable panels for closing said opening, a stationary support near the adjacent ends of the panels, catches arranged between the panels and said support, a movable member for preventing the operation of said catches, and a key lock for controlling the movement of said member.

15. A mail chute open at one side, in combination with two removable panels for closing said opening, a stationary support near the adjacent ends of the panels, a movable catch adapted to engage and secure either or both of said panels depending upon its position and means embodying a key lock for controlling the operation of said catch.

16. A mail chute open at one side, in combination with a plurality of movable panels for closing said opening, stationary abutments arranged at intervals adjacent saip opening and catchers thereon for engaging the panels, removable members for engaging the ends of the panels and key locks for controlling the movement of said members.

17. A mail chute open at one side, in combination with a plurality of movable panels for closing said opening, brackets arranged at intervals adjacent said opening embodying cross bars and the forwardly-extending arms, the ends of said panels engaging the cross bars, locking bars also engaging the ends of the panels and key locks for securing said bars to the arms on the brackets.

18. A mail chute embodying movable parts, in combination with a bracket arranged between them having the front bar and a movable catch thereon arranged to coöperate with and retain both said parts when in an intermediate position and to engage and retain one only when moved in either direction.

19. In a mail chute embodying movable parts, the combination with the bracket having the cross bar arranged between said parts, the movable catch plate mounted thereon having the portions at opposite ends and sides for engaging both or either of said movable parts.

20. In a mail chute embodying movable parts, the combination of the bracket having the cross bar arranged between the parts, the plate longitudinally movable on said bar and provided with the portions on opposite sides of the ends adapted to engage the movable parts successively when moved in opposite directions or both when in an intermediate position.

21. In a mail chute, the combination of a support, an open bracket, means for fastening it to the support arranged at the upper rear side thereof, an open channel section secured to said bracket below the fastening means, a removable panel for closing the open side of the channel, a member coöperating with the bracket arms and with the panel to secure the latter, and a key lock for controlling the movement of the member.

22. In a mail chute, the combination of the support, the open bracket, means for fastening it to the support arranged at the upper rear side thereof, an open channel section secured to the bracket below said fastening means, a removable panel for closing the open side of the channel, a member extending between the sides at the front of the bracket and engaging the panel, and a key lock for controlling the movement of the member.

23. In a mail chute, the combination with the hollow base and fastening devices therefor accessible from the interior, of the base cap piece engaging the base and prevented from lateral movement thereon, the tube supported on the cap piece and a movable portion of the chute engaging the cap piece and preventing vertical movement thereof.

24. In a mail chute, the combination with the hollow base and fastening devices therefor accessible from the interior, of the base cap piece engaging the base and prevented from lateral movement thereon, and a movable portion of the chute engaging the cap piece and preventing vertical movement thereof.

25. In a mail chute, the combination with a chute section having the open side, the base, fastening devices therefor accessible from the interior, of the base cap piece engaging the base and prevented from lateral movement thereon, and a removable panel for the open side of the chute engaging the cap plate and preventing vertical movement thereof.

26. In a mail chute, the combination with a chute section having the open side and a removable panel for closing it, of a base, fastening devices therefor accessible from the interior, a base cap piece on the base engaged and secured by the removable panel when the latter is in position over the chute opening.

27. In a mail chute, the combination with a chute section having the open side and the removable panel for closing it, of the base, the base cap piece engaging the base and the tube supported thereon, said panel engaging the cap piece to secure the parts when in position over the chute opening.

28. In a mail chute, the combination with a chute section having the open side, and a removable panel for closing it, of the base, the base cap piece having the lugs engaging the base and other lugs, the tube supported on the last mentioned lugs, the lower end of said panel entering the cap piece and serving to lock the parts in position.

29. In a mail chute, the combination with a chute section having an open side and a vertically-movable panel, of a base, a base cap thereon and connections between the panel and base cap for securing the latter on the base when said panel is in position over the opening.

30. In a mail chute, the combination with a chute section open at one side, and a movable panel for closing it, of the bracket supporting the section at its upper end and having the downwardly-extending projection at the front with which the upper end of the panel engages.

31. In a mail chute, the combination with a support, a bracket secured thereto, a channel section attached to the bracket, a removable panel for said channel coöperating at one end with the bracket, and held in position thereby, of a tubular section closed at the front and sides attached to the bracket, a cornice molding and clamping devices for holding it in adjusted position on said tubular section.

32. In a mail chute, the combination with a support, a bracket secured thereto, a channel secured to the bracket, and a removable panel for closing the open side thereof, of a cap or cover for the chute extending over the bracket and securing devices therefor arranged beneath the cap and accessible only when the panel is removed.

33. In a mail chute, the combination with an open channel section, of a removable panel for closing the opening and having its edges extended inwardly beyond the sides of the opening when in position and detachable catches arranged between the coöperating edges of the channel and panel for temporarily holding the parts when the panel is moved bodily toward the edges of the channel.

34. In a mail chute, the combination with an open channel section having the yielding outwardly extending flanges at the sides of the opening, of a removable panel movable flatwise between the flanges for closing said opening with which said yielding flanges coöperate to hold the panel temporarily in position.

35. In a mail chute, the combination with an open channel section having the yielding spring catches at the sides of the opening, of the removable panel for closing said opening movable toward the edges of the channel between the catches and coöperating projections and recesses between the catches and panel for temporarily holding the parts together.

JOSEPH WARREN CUTLER.

Witnesses:
M. BRAGDON,
E. J. McAFFREY.